United States Patent [19]
Kohler

[11] 3,915,610
[45] Oct. 28, 1975

[54] ALIGNMENT ASSEMBLIES FOR PLASTIC INJECTION MOLDS

[76] Inventor: Arthur Kohler, 736 E. 345th St., Eastlake, Ohio 44094

[22] Filed: Apr. 10, 1974

[21] Appl. No.: 459,707

[52] U.S. Cl. .......................... 425/248; 425/DIG. 227
[51] Int. Cl. ................................................. B29f 1/00
[58] Field of Search ............ 425/247, 248, DIG. 227

[56] References Cited
UNITED STATES PATENTS

| | | | |
|---|---|---|---|
| 2,439,966 | 4/1948 | Dinzl .............................. | 425/244 X |
| 2,821,750 | 2/1958 | Huelskamp ..................... | 425/247 X |

FOREIGN PATENTS OR APPLICATIONS

| | | | |
|---|---|---|---|
| 1,014,316 | 8/1957 | Germany ........................... | 425/247 |

*Primary Examiner*—Francis S. Husar
*Assistant Examiner*—Carl A. Rowold

[57] ABSTRACT

An alignment assembly for a multiple cavity plastic molding die is disclosed. Each assembly includes a base communicating with its respective cavity and a counterbore. A valve body is provided which has a stem portion slidably and sealingly disposed in the bore and a head portion disposed in the counterbore. The body has a through passage. The head portion is configured to mate with an ejection nozzle. The sliding sealing fit of the stem allows axial movement of the body to react to the pressure generated in the cavity by the injected plastic and thereby be forced tightly against the nozzle to prevent flash. Other features are disclosed.

6 Claims, 5 Drawing Figures

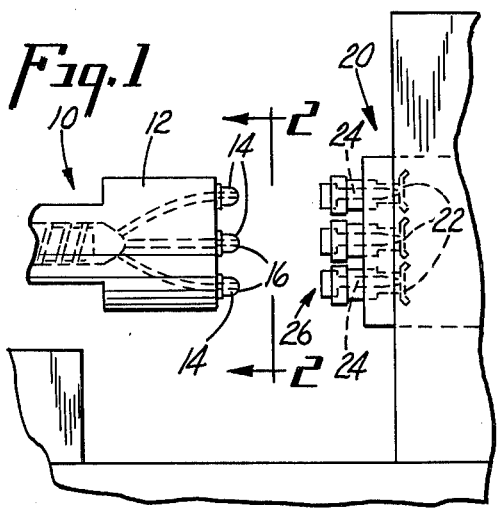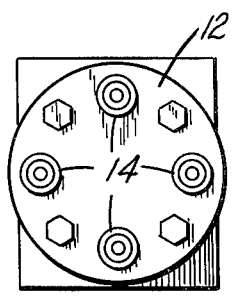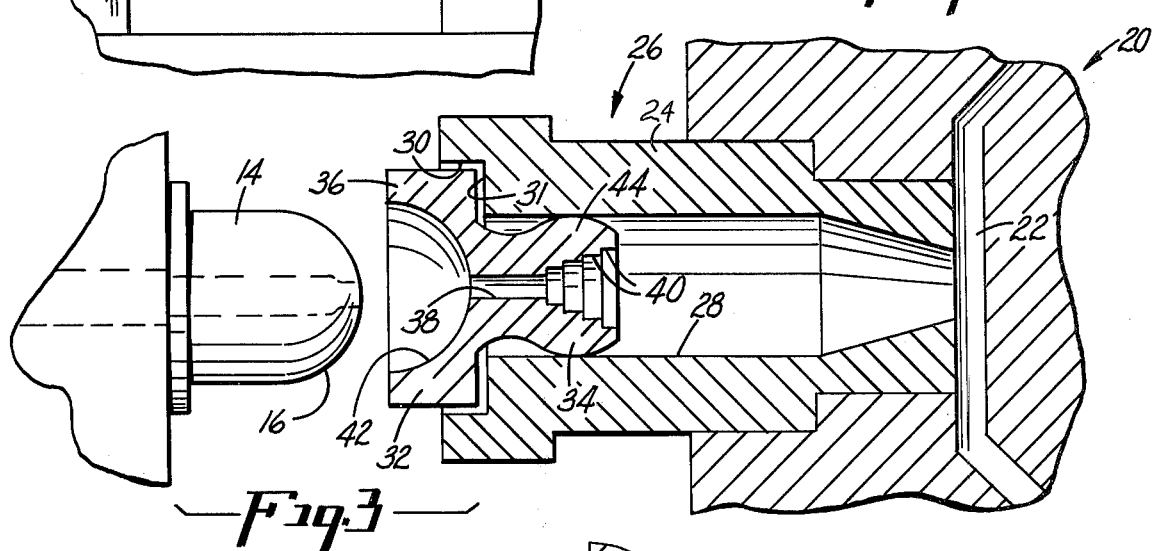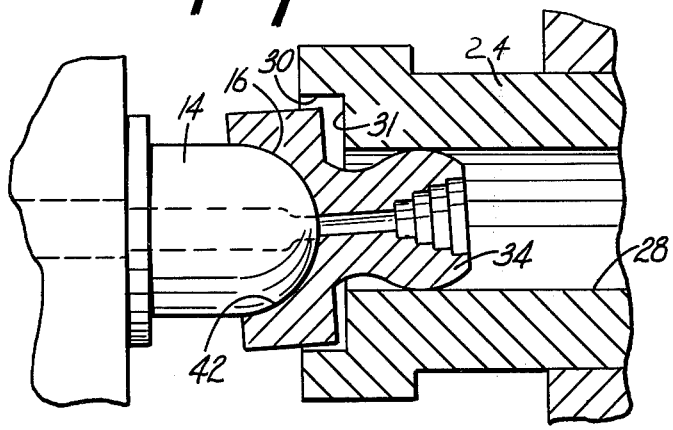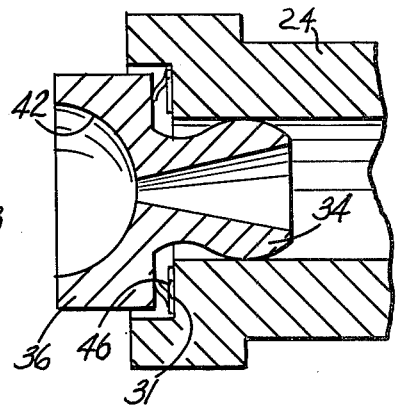

ALIGNMENT ASSEMBLIES FOR PLASTIC INJECTION MOLDS

BACKGROUND OF THE INVENTION

This invention relates generally to plastic injection molds and more particularly to shut off valves for plastic injection molds where plastic is received from a multiplicity of injection nozzles concomitantly. The device of this invention is especially adapted for use with systems generally of the type disclosed in my U.S. Pat. No. 3,758,252. As was discussed in this patent, it is often desirable, and even economically necessary, to utilize multiple cavity molds to obtain maximum efficiency. According to the invention, in said U.S. Pat. No. 3,758,252 a multiple nozzle injection molding assembly is provided which includes a body which mounts a plurality of nozzles. Each of the nozzles is offset from the axis of the plastic inlet to the body. Separate curved passages connect each nozzle with the inlet opening and the configuration of the passages is of a curvature which will allow smooth non-turbulent flow from the inlet passage to each of the nozzles.

The device of U.S. Pat. No. 3,578,252 is designed to operate with a conventional mold assembly which will normally include a conventional sprue bushing or a hot nozzle runner type sprue at each entrance to a mold cavity, each of which sprue bushing is adapted to receive the tip of one nozzle and connect the passage of one nozzle by means of a through bore in the bushing to the cavity within the mold. When the molding pressures are relatively low this particular arrangement presents no problem. However, with high pressures, if there is a multiplicity of nozzles and especially where there are more than two nozzles, it has been found that it is difficult to exactly mate and firmly seat each of the nozzles in its respective sprue bushing so as to completely seal between the nozzle and the bushing and thereby prevent flash. This problem is further compounded by the necessity of having to exactly space and align each of the nozzles with the respective sprue bushing in a circumferential direction, a radial direction, and an axial direction, thus requiring very close three dimensional accuracy. In fact, with more than two nozzles under high pressure, flash, i.e. the spraying out from around the nozzle of hot plastic under pressure has been encountered. The flash or spraying out is generally encountered at or near the conclusion of the molding cycle when the plastic has been injected into the cavity and further injecting of the material is resisted by an ever increasing build-up of pressure or resistance within each of the cavities to the further injection of the material thus causing a pressure induced from within the cavity and transmitted out to the interface between the nozzle and the sprue bushing which if not closely mated results in plastic being forced from between this interface which is characterized as "flash."

SUMMARY OF THE INVENTION

According to the present invention, a die for molding plastic parts is provided in which there are a plurality of openings therein communicating with cavity means for the reception of plastic and which is adapted to coact with a plurality of nozzles, one for each opening. The die incorporates an improved alignment assembly in each opening. Each alignment assembly includes a bore portion and a counter bore portion separated by a shoulder in the die. A alignment body having a stem portion slidably disposed in the bore portion is provided and the alignment body has an enlarged head portion disposed in the counter bore. The enlarged head is disposed to coact with the shoulder to limit the axial travel of the body in a direction toward the cavity. The body has a through axial opening and the head has an outwardly oriented surface shaped complimentary to the external surface of the respective nozzle and disposed to mate therewith, whereby pressure generated by the plastic in the cavity at the conclusion of the injection cycle will move the alignment body axially in the bore and force the surface on the head thereof into sealing alignment with its respective nozzle thereby causing a sealing engagement of the nozzle and the alignment body, the sealing pressure being proportionately increased as the pressure generated in the cavity increases to thereby effectively prevent flash.

DESCRIPTION OF THE DRAWING

FIG. 1 is an elevational view somewhat diagramatic of a portion of a molding machine and molding die for molding plastic parts incorporating the present invention;

FIG. 2 is a sectional view taken substantially along the plane designated by the line 2—2 of FIG. 1;

FIG. 3 is an enlarged detailed sectional view of one alignment assembly and a portion of its cavity and showing the nozzle cooperative therewith in the disengaged position;

FIG. 4 is a view similar to FIG. 3, but showing the nozzle engaged with the alignment assembly and illustrating compensation for a slight misalignment of the nozzle; and FIG. 5 is a detailed sectional view showing another embodiment of the alignment assembly of the present invention.

DESCRIPTION OF THE PREFERRED EMBODIMENTS

The present invention is shown and described in its preferred embodiments as utilized in a four cavity mold, each cavity being fed by an independent nozzle from a nozzle head assembly secured to a plastic injection molding machine. It is to be understood, however, that the invention is not limited to a four cavity, four nozzle system, but is equally applicable in any multiple nozzle system utilized to inject plastic into a multiplicity of openings.

Referring now to the drawing and for the present to FIGS. 1 and 2, a portion of a plastic molding machine is shown and designated generally as 10, which is of the screw feed type wherein the plastic is fed by screw action and ejected by means of plunger action. An ejection head 12 is provided which is secured to the machine 10 which has four ejection nozzles 14 having spherical end surfaces 16. The plastic is ejected from each of the nozzle concomitantly during an ejection cycle, all as is more fully explained in said U.S. Pat. No. 3,758,252.

A plastic injection mold 20 is provided to coact with the nozzles 14. Each mold 20 has a plurality of sprue bushings 24 which communicate with cavities 22 which cavities may be formed in a separate plate. The number of bushings 24 corresponds to the number of nozzles 16 which are utilized to perform the molding operation and each of the bushings 24 has a check-valve assembly designated generally as 26. One embodiment of a check-valve assembly is shown in detail in FIGS. 3 and 4.

Each alignment assembly 26 includes a bore 28 and a counterbore 30 with a shoulder 31 separating the bore from the counterbore formed in the bushing. A alignment body 32 is provided which has a stem portion 34 disposed in the bore 28 and an enlarged head portion 36 disposed in the counterbore 30. A through axial passage or opening 38 extends through the valve body 32. The through passage 38 is provided with a plurality of steps 40, the purpose of which will be explained presently. The head 36 is also provided with a spherical depression 42 which is of a size to mate with the spherical surface 16 of its respective nozzle 14.

As can best be seen in FIG. 3, the head portion 36 of the valve body 32 is slightly smaller in diameter than the diameter of the counterbore 30. Also, the stem portion 34 has an enlarged portion or bulge 44 which is preferably an arc of a large diameter circle in cross section. (The amount of radius is shown somewhat exaggerated in order to illustrate the existance of such a radius, it being understood that in practice the radius normally will be a much shallower radius than that depicted.) The size of the bulge 44, at its thickest is substantially equal to the size of the bore 28, so that a sealing sliding fit, even a "press fit" results.

In operation the molding injection cycle is begun by first charging the injection machine with sufficient plastic to fill all the cavities that are to be filled during the particular cycle. The machine is then advanced until the nozzles 14 come into contact with their respective valve bodies 32. FIG. 4 illustrates how the configuration of this particular alignment body compensates for a slight misalignment of the nozzle with the axis of the nozzle being slightly below the axis of the through axial passage. When the nozzle 14 encounters the alignment body 32 and is continued to advance the coaction of the spherical surface 16 and spherical depression 42 will generate a force tending to cause the alignment body 32 to tilt slightly. Because of the fact that the stem 34 has a radiused bulge 44 and the head portion 36 is slightly smaller in diameter than the size of the counter bore 30 this tilting is possible. The bulge configuration allows the valve body to tilt while still maintaining the sealing fit.

When all of the nozzles have been seated (as shown in FIG. 4) the injection cycle of the machine can begin and plastic will be ejected from each nozzle through the passage 38 to the bushings 24 and then into the cavity 22. During the initial portion of the molding cycle, since the cavity is empty, there is a rather free unrestricted flow of plastic into the cavity with little or no resistance to the flow of the plastic into the cavity. In the past this outward pressure, when it reached a sufficient magnitude, often resulted in the escape of plastic between the nozzle and the sprue bushing. However, in the present invention as the pressure builds up in the cavity it will exert force on the rear face of the stem 34 thus generating a force on the alignment body 32 which will urge it outwardly away from the cavity and urge the spherical depression 42 into tighter engagement with the spherical surface 16 of the nozzle 14. The greater the pressure generated in the cavity, the greater will be the force urging the spherical depression 42 into engagement with the spherical surface 16, thus resulting in a tight sealing engagement between these two spherical surfaces. Also, the sealing engagement force will increase proportionally to the increase in pressure generated by the plastic in the cavity 22, thereby generating a very positive sealing action which will resist flash. The stepped configuration of the bore 38 helps in transmitting this pressure generated by the plastic in the cavity 32. The sealing fit of the stem in the bore prevents leakage of plastic therebetween.

Referring now to FIG. 5, another embodiment of the invention is shown which provides for a mechanically generated sealing pre-pressure between the nozzle and the alignment body. In many instances this is preferably, especially in higher pressure applications, or when there is more than two nozzles. In this embodiment the alignment assembly is similar to that as previously described but with the addition of an annular spring ring 46 disposed between the shoulder 31 and the surface of the enlarged head portion 36. This spring ring preferably is what is known as a "Bellville washer" which takes the form of a complete, unbroken, annular ring deformed so as to provide spring pressure tending to resist the movement of the alignment body 32 toward the cavity 22. This Bellville ring 46 is provided to assure a good initial mating fit between the spherical surfaces 16 of the nozzles and the spherical depression 42 on the head portions 36. During the movement of the nozzles 14 into engagement with the alignment bodies, the nozzles will first engage the depressions and as they move will tend to compress the springs 46 which will provide this good close initial fit and will allow for a certain amount of slight axial misalignment of the nozzles and their respective alignment bodies. Also, it is possible to utilize several rings 46, in a stacked configuration to increase the resilient force, and/or adjust the axial location of the alignment body. Further, by varying the number and strength of the washers it is possible to control to some extent the density of the molded part.

In this embodiment, also the passage 38 is not slipped, but tapered. This is somewhat less expensive to make, and in many instances works quite as well.

In the above embodiments the bores and counterbores have been formed in sprue bushings secured in the die plate, and in some cases a heater can be provided in the bushings such as with the so-called "hot runner" type of sprue bushing such as shown in U.S. Pat. Nos. 3,010,155 and 3,767,340. However, if desired, the valve assembly can be formed directly in the die plate itself. Hence, as used herein, the term die includes any separable part thereof such as a sprue bushing or the like.

What is claimed is:

1. In a die for molding plastic parts in which there are a plurality of openings therein communicating with cavity means for the reception of plastic and which is adapted to coact with a plurality of nozzles, one for each opening, an alignment assembly in each opening comprising, said opening having a bore portion and a counter bore portion separated by a shoulder, a valve body having a stem portion axially slidably and sealingly disposed in said bore portion and an enlarged head portion disposed in said counter bore portion, said stem of the valve body being configured to coact with the bore to provide tilting movement of the valve body within the bore, said enlarged head portion being disposed to coact with said shoulder to limit the axial travel of said body in the direction toward said cavity means, said body having a through axial opening, said head portion having an outwardly oriented surface thereof shaped complimentary to the external shape of its respective nozzle and disposed to mate therewith, whereby the pressure generated by the plastic in the cavity means at the conclusion of the ejection cycle will move the valve body axially in the bore and force the surface on the head portion thereof into sealing engagement with its respective nozzle.

2. The invention as defined in claim 1 further characterized thereof by spring means interposed between the enlarged head portion of the body and the shoulder means.

3. The invention as defined in claim 1 wherein the configuration of the stem includes a bulge arcuate in longitudinal section.

4. The invention as defined in claim 3 wherein the arcuate configuration is the arc of a circle.

5. The invention as defined in claim 1 wherein the through axial opening in the valve body increases in diameter the direction toward the cavity means.

6. The invention as defined in claim 5 wherein said increase in diameter of the through axial opening is provided by at least one discreet step in said opening.

* * * * *